United States Patent
Breunsbach

(10) Patent No.: US 7,653,502 B2
(45) Date of Patent: Jan. 26, 2010

(54) DATA LOGGER WITH PASS/FAIL ANALYSIS

(75) Inventor: Rex L. Breunsbach, Clackamas, OR (US)

(73) Assignee: Electronic Controls Design, Inc., Milwaukie, OR (US)

( * ) Notice: Subject to any disclaimer, the term of this patent is extended or adjusted under 35 U.S.C. 154(b) by 0 days.

(21) Appl. No.: 11/935,342

(22) Filed: Nov. 5, 2007

(65) Prior Publication Data

US 2009/0119046 A1    May 7, 2009

(51) Int. Cl.
*G06F 11/32* (2006.01)
(52) U.S. Cl. .................................. 702/82; 374/137
(58) Field of Classification Search ............. 702/81–82, 702/84, 130, 132, 136; 374/10–13, 137, 374/166–167, 112, 179, 170.1; 707/101–102, 707/104.1
See application file for complete search history.

(56) References Cited

U.S. PATENT DOCUMENTS

| | | | | |
|---|---|---|---|---|
| 5,580,794 A * | 12/1996 | Allen | ............... | 436/169 |
| 6,057,549 A * | 5/2000 | Castleman | ............... | 250/339.15 |
| 6,062,728 A | 5/2000 | Breunsbach et al. | | |
| 6,168,064 B1 * | 1/2001 | Berkin | ............... | 228/9 |
| 6,375,351 B1 | 4/2002 | Breunsbach et al. | | |
| 6,402,372 B1 | 6/2002 | Saunders | | |
| 6,495,800 B2 * | 12/2002 | Richert et al. | ............... | 219/388 |
| 6,511,223 B1 | 1/2003 | Austen et al. | | |
| 6,520,675 B1 | 2/2003 | Breunsbach et al. | | |
| 6,766,267 B2 * | 7/2004 | Floyd et al. | ............... | 702/120 |
| 6,799,712 B1 * | 10/2004 | Austen et al. | ............... | 228/102 |
| 6,993,927 B2 | 2/2006 | Austen et al. | | |
| 7,165,011 B1 * | 1/2007 | Kaushal et al. | ............... | 702/182 |
| 2008/0012499 A1 * | 1/2008 | Ragay et al. | ............... | 315/113 |

* cited by examiner

*Primary Examiner*—Eliseo Ramos Feliciano
*Assistant Examiner*—Mary C Baran
(74) *Attorney, Agent, or Firm*—Klarquist Sparkman, LLP

(57) ABSTRACT

A data logger analyzes temperature data associated with a product passing through a conveyor oven and provides a visual indication indicating whether the product's temperature profile is within acceptable limits. Thus, an operator need not download captured temperature data to a computer in order to determine whether the oven settings produce a product profile that is within acceptable limits. In one embodiment, the data logger stores criteria for an acceptable product profile, and collects the temperature data and analyzes whether the temperature profile data is within the acceptable limits of the criteria. In another embodiment, a button and a pass/fail indicator are located externally on data logger. An operator depresses the button in order to request whether the product profile passed or failed the criteria. In response to depressing the button, the pass/fail indicator provides visual indication of whether the current oven settings produce an acceptable product profile.

6 Claims, 5 Drawing Sheets

DATA LOGGER WITH PASS/FAIL ANALYSIS

FIELD

The present invention concerns a profiling system for determining optimal process settings in a conveyor oven, and, particularly to a data logger used in such a profiling system.

BACKGROUND

Conveyor ovens (also called furnaces) are used in a variety of industries including the electronics, baking, and painting industries. Generally, conveyor ovens have multiple heating zones and may have one or more cooling zones through which product is conveyed. The heating zones are thermally isolated from each other by air curtains or other means. Such thermal isolation allows each zone to be maintained at a temperature that differs from other zones in the oven. A particular advantage of conveyor ovens with multiple heating zones is that products can be heated to different temperatures at different times and rates as they pass through the oven.

In the electronics industry, conveyor ovens, known as reflow ovens, are used to electrically bond electronic components to printed circuit boards (PCBs) with solder paste. Typically, the soldering process within a conveyor oven can be characterized by the following phases: preheat or ramp phase, the dwell or soak phase, the reflow or spike phase and the cooling phase. In the preheat phase, the solder paste is heated from room temperature to a preheat temperature to promote evaporation of the solvents, or carriers, in the solder paste. During the soak phase, the solder paste is permitted to "soak" for a predetermined period of time at a temperature range at which the flux, the active ingredient in the solder paste, becomes active. In the reflow phase, the solder paste is heated above the liquidous, or melting temperature of the solder for a predetermined period of time sufficient to permit reflow (i.e., melting or wetting) of the solder paste. In the cooling phase, the solder joint solidifies, thereby electrically bonding the components to the circuit board.

Typically, the thermal requirements for a solder paste (also called solder paste specifications) for preheat, soak and reflow phases are specified by the manufacturer of the paste. Generally speaking, "profiling" is the process of determining the process settings for the oven that will best satisfy the thermal requirements of the solder paste without damaging the electronic components. Such process settings may include, for example, the temperature settings of each oven zone and the oven conveyor speed.

Devices for measuring the temperature profile of a product conveyed through an oven (i.e., the temperature response of the product) are known. For example, electronic data loggers (also called data collectors or monitors) have been developed that attach thermocouple sensors to a test PCB. One such data logger, the M.O.L.E.® temperature profiler, is a profiler sold commercially by Electronic Controls Design, Inc., of Milwaukie, Oreg. Beyond the M.O.L.E.®, the test PCB has various thermocouples strategically placed thereon. Traditionally, each thermocouple is connected directly to the electronic data logger. The electronic data logger is physically spaced apart from the PCB so as not to affect the heating of the PCB and thereby cause inaccurate temperature profiling. The data logger stores temperature information measured by the thermocouples, and that information can be processed to determine and control the optimal temperature profile of the product.

Once the data logger has passed through the oven, the collected data is downloaded to a computer using a special docking station, or via RF or cable. A software package located on the computer graphically illustrates a temperature profile of the collected data and provides a comparison to an optimal profile. The operator estimates changes to the oven settings for reducing the difference between the temperature response of the assembly and the desired thermal profile to within an allowable tolerance. The operator adjusts the oven settings and repeats the process until the appropriate thermal requirements for the solder paste are reached.

There are numerous inefficiencies in the process of setting the ovens to produce an optimal product profile. It is possible in large manufacturing sites that the computer is distant from the ovens. Thus, the operator may spend considerable time walking back and forth between the ovens and the computer in order to determine if the oven settings need further adjustment. There are also delays in transmitting data to the computer and performing the computer analysis in order to determine if the oven settings are at the proper levels. Often the thermal profile must be examined by qualified personal other then those who may have passed the data logger through the oven, further delaying the analysis of the profile if that person is not available.

It is desirable therefore to speed the process of determining whether oven settings produce the proper profile for a product.

SUMMARY

The disclosed embodiments speed the profiling process by providing a visual pass or fail indication directly on the data logger itself. Thus, an operator need not download captured temperature data to a computer in order to determine whether the oven settings produce a product profile within the acceptable limits.

In one embodiment, the data logger stores criteria for an acceptable profile. The data logger then collects thermocouple (temperature) data and analyzes whether such data is within the acceptable limits as defined by the pass/fail criteria.

In another embodiment, a button and a pass/fail indicator are located on the housing of the data logger. An operator depresses the button in order to request whether the product profile passed or failed the stored criteria. In response, the pass/fail indicator provides visual indication of whether the current oven settings produce a product profile that is within acceptable limits.

The foregoing and other features and advantages will become more apparent from the following detailed description, which proceeds with reference to the accompanying figures.

DETAILED DESCRIPTION

Figure 1:
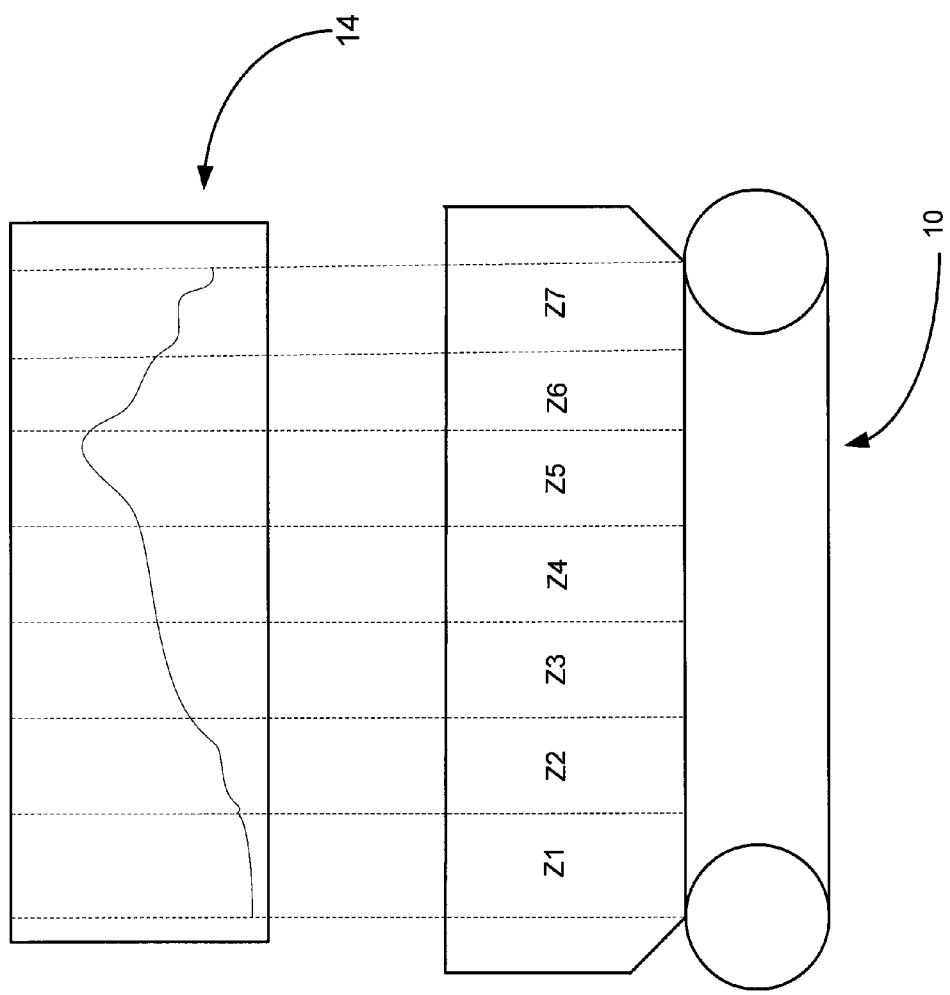
FIG. 1 is a schematic side view of a multiple zone conveyor oven with a corresponding temperature profile that may be displayed on a computer.

The disclosed embodiments relate to a data logger for determining whether a conveyor oven is set at the optimal process settings, such as an oven 10 shown in FIG. 1. In an exemplary application described in detail below, the data logger is used to determine optimal process settings for a reflow soldering process in which PCB assemblies are conveyed through the oven 10. However, the data logger described herein may be adapted for use with other conveyor oven processes, such as metal annealing, glue curing, paint curing and food processing.

Oven 10 in the present example has seven zones. The first five zones (Z1-Z5) are heating zones and the last two zones (Z6 and Z7) are cooling zones. However, the conveyor oven may have any number of heating or cooling zones. Indeed, the particular oven used is irrelevant. For example, some machines may only cool rather than heat. The product has a certain temperature profile as indicated at 14, which may be displayed on a separate computer (See FIG. 2). The profiling software may be run on a computer that is not related to the oven or on the oven's controlling PC. Numerous profile parameters may be used in analyzing the oven settings. For example, the maximum heating rate of the product when placed in the oven (i.e., called the initial slope), or the soak time (i.e., product stays between two temperatures for a predetermined period of time), or the time above liquidous, or the peak temperature. One or more of these profile parameters may be used to dictate oven settings.

Figure 2:
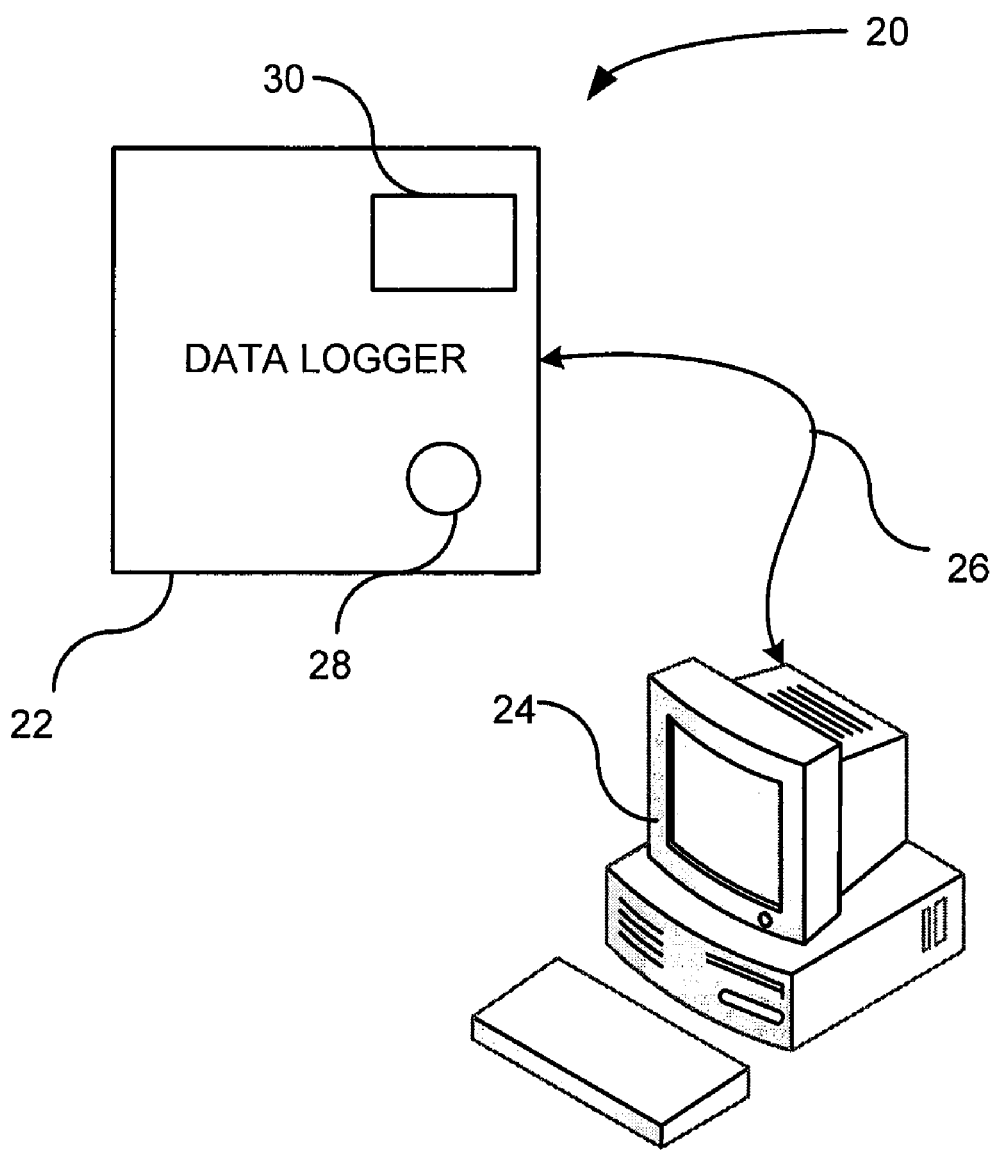
FIG. 2 shows a data logger coupled to a general purpose computer.

FIG. 2 shows a profiling system 20 including a data logger 22 and a computer 24. In prior-art systems, data flowed from the data logger to the computer, not vice versa. However, in the disclosed embodiment, as shown at 26, data flow is bidirectional. In particular, the computer supplies pass/fail criteria to the data logger 22 for storage therein. The data logger then uses the stored criteria to analyze whether the collected thermocouple data is within acceptable limits. The data logger may include other features not previously available. For example, an external display or indicator 28 (e.g., LED) provides a pass/fail indication so that an operator knows whether the oven is at the proper setting without the need to download data to the computer 24. The data logger 22 may also include a user interface button 30 that allows the user to request that the data logger analyze the collected thermocouple data to determine if it is within acceptable limits of the stored criteria. Instead of the interface button 30, the data logger 22 may include other means for sensing that it is an appropriate time to analyze the data and provide a pass/fail indication. For example, the data logger 22 may sense that it is outside of the oven through magnetic detectors, change in temperature, change in acceleration, etc., and in response perform the appropriate analysis of the data with a corresponding display of the result on display 28. The operator may also download temperature data to the computer for a more detailed graphical profile analysis.

Figure 3:
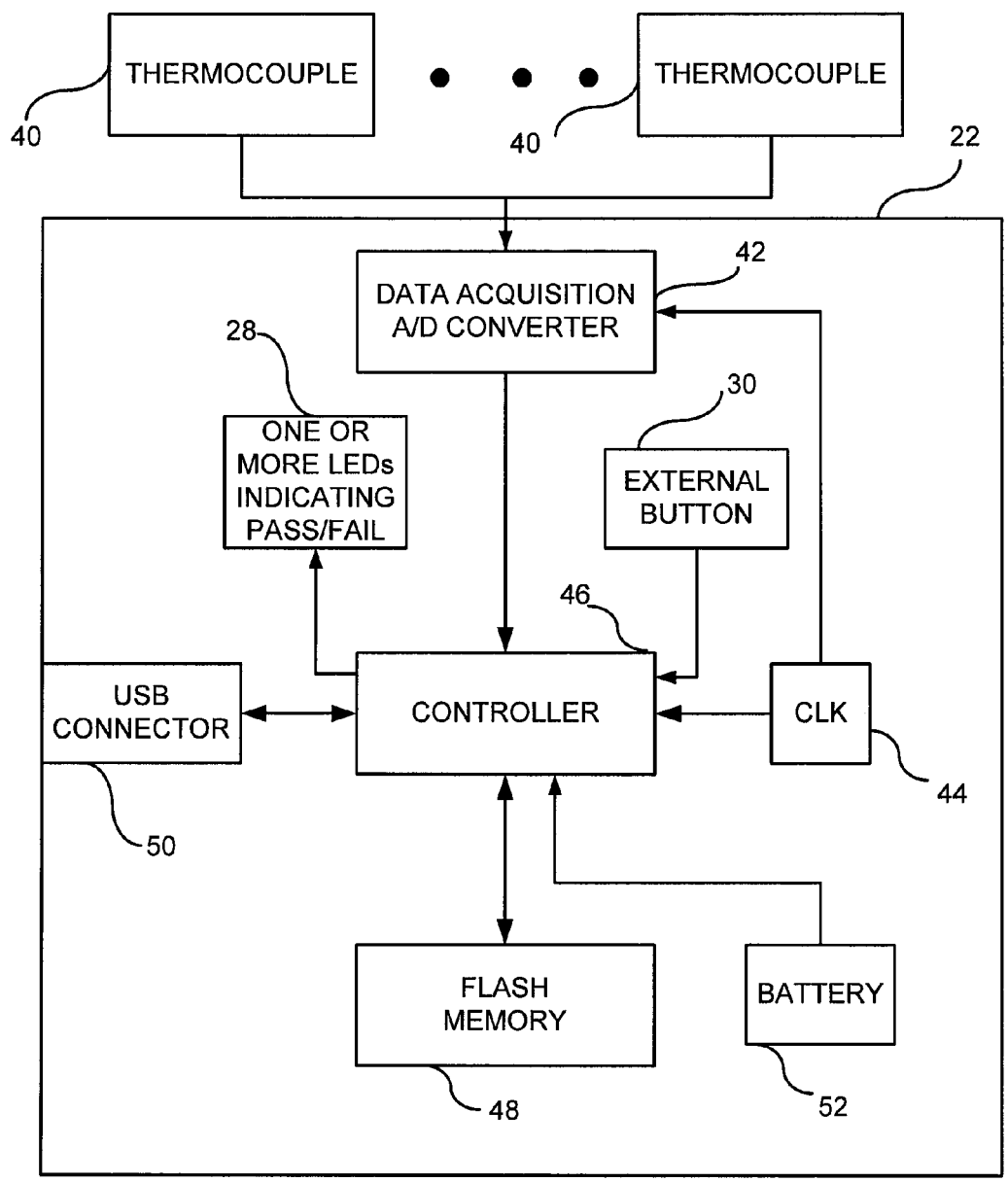
FIG. 3 is a hardware diagram of the data logger.

FIG. 3 shows a hardware diagram of the data logger 22. The data logger 22 is designed to receive inputs from one or more external thermocouples 40 that are typically placed on a test product (not shown). A data acquisition portion 42 includes an A/D converter and is coupled to the thermocouples 40. The data acquisition portion 42 is responsive to a clock 44 so that once every clock cycle the data acquisition portion collects new data from the thermocouples 40. The output of the A/D converter is coupled to a controller 46, which stores the collected data in a memory 48. The controller 46 may take a variety of forms, such as a microcontroller, microprocessor, etc. The memory 48 may be a flash memory or any type of RAM. The memory 48 has a portion for storing collected thermocouple data and a portion for storing pass/fail criteria received through a standard interface connector 50. The memory may be separate from the controller 46 or embedded therein. The pass/fail criteria data may be determined in a number of ways, such as through user input or automatically through a database supplied by a manufacturer (e.g., a manufacturer of solder paste). In any event, the pass/fail criteria is passed to the data logger 22 through the standard interface port 50 by a source means, such as a computer 24. A battery 52 powers all components in the data logger 22 in a well known manner. The external button 30 is shown coupled to the controller 46. In response to a depression of the button 30, the controller accesses data stored in the memory 48 and performs an analysis to determine if the product profile was within the desired limits. Different parameters may be used in the analysis, depending on the particular application. For example, in the case of peak temperature, the pass/fail criteria may provide upper and lower limits between 210° C. and 230° C. The controller 46 analyzes the collected thermocouple data by determining the peak temperature of the collected data using well-established programming techniques. Then a simple comparison is performed to determine if the peak temperature of the collected data is within the upper and lower temperature limits of the pass/fail criteria. If yes, then the oven passed the peak temperature portion of the test. Other tests may need to be performed based on other parameters, such as soak time, time above liquidous, and the initial slope. However, other parameters may be used depending on the application. For soak time, the controller 46 checks the collected thermocouple data to see if a thermocouple was between two temperatures (e.g., 150° C. and 170° C.) for a period of time (e.g., between 30 and 90 seconds). Thus, the parameters and the criteria can be based on time, temperature, a combination of time and temperature or other desired criteria. In any event, if all of the tests are within the desired limits, the controller 46 activates an LED 28 indicating that the oven settings produced a product profile that is within acceptable limits. The single LED may be replaced by a more elaborate display, such as a numerical display that provides a number indicative of an overall profile score. If any of the tests failed, one of the LEDs 28 is lit red indicating that further manipulation of the oven settings may be required.

Figure 4:
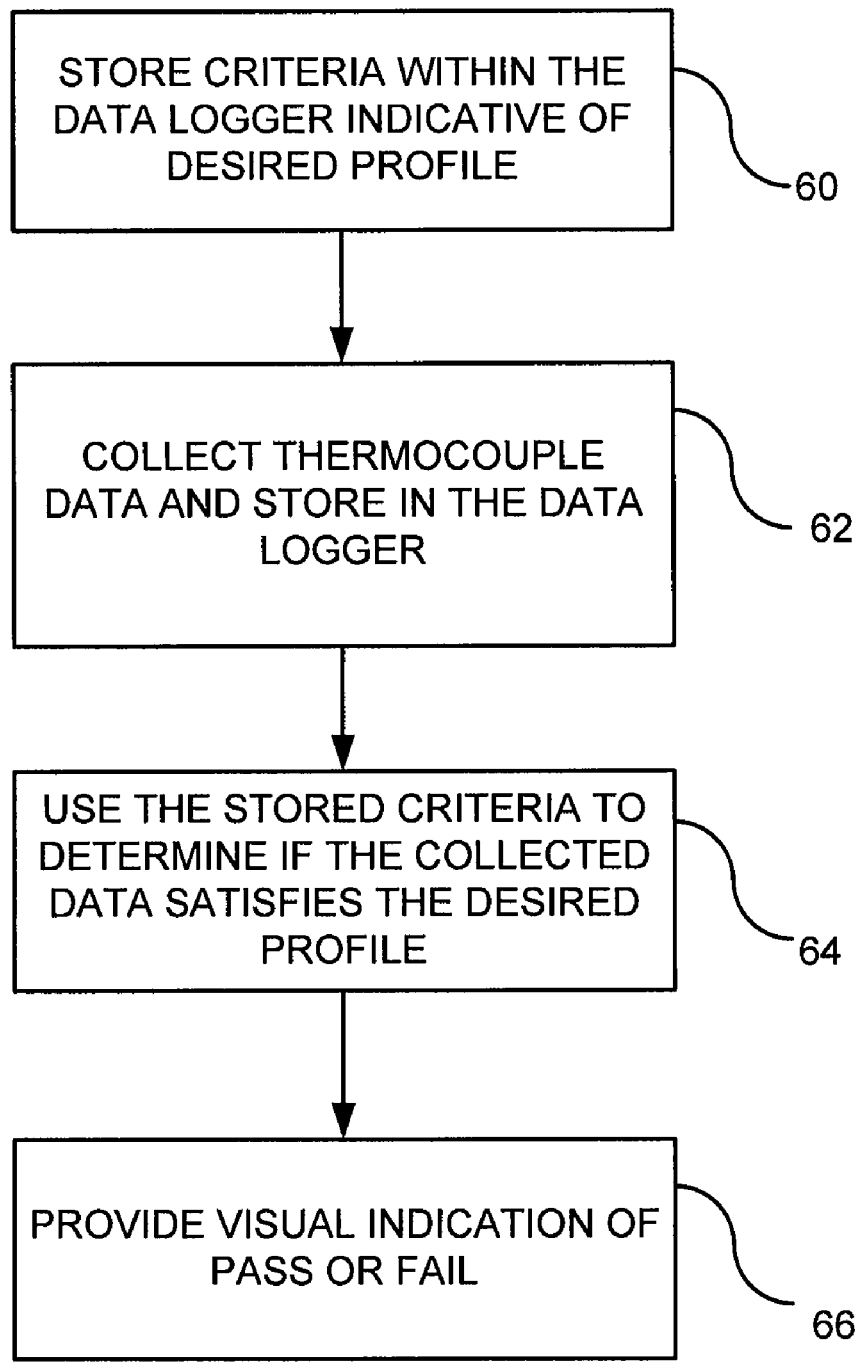
FIG. 4 is a flowchart of a method for providing a pass/fail indication using the data logger to determine if the oven satisfies the desired product profile characteristics.

FIG. 4 is a flowchart of a method for testing oven settings using a data logger, which is sized to pass through a conveyor oven. In process block 60, pass/fail criteria are stored in memory in the data logger. The pass/fail criteria indicate whether the oven is set to produce the desired product profile. As previously described, the pass/fail criteria are initially determined using the computer 24 and downloaded to the data logger 22. In process block 62, the data logger is passed through the oven to collect temperature data. The thermocouple sensors are strategically placed on a product being tested and pass temperature data to the data logger that samples the temperature data at fixed clock intervals. The temperature data is then stored in memory 48 on the data logger 22. In process block 64, an analysis on the collected temperature data is performed in the data logger using the controller 46. Previous data loggers did not include intelligence to perform analysis of the collected data. The analysis depends on the particular parameters being tested. Currently, the product profile parameters used are initial slope, soak time, time above liquidous and peak temperature, but other parameters may readily be used. For each of these parameters, the controller calculates a number associated with the temperature data. For example, the peak temperature may be 220° C. A comparison is then performed to ensure that 220° C. is within the limits of the pass/fail criteria. For example, the pass/fail criteria for peak temperature may include upper and lower temperature limits. If 220° C. is between those limits then the peak temperature test passed. In process block 66, the controller 46 provides a visual indication on a data-logger display whether all of the tests passed or failed. Thus, the operator need not download data to a computer and perform an analysis on the computer. Instead, the results are immediately available using the data logger itself.

Figure 5:
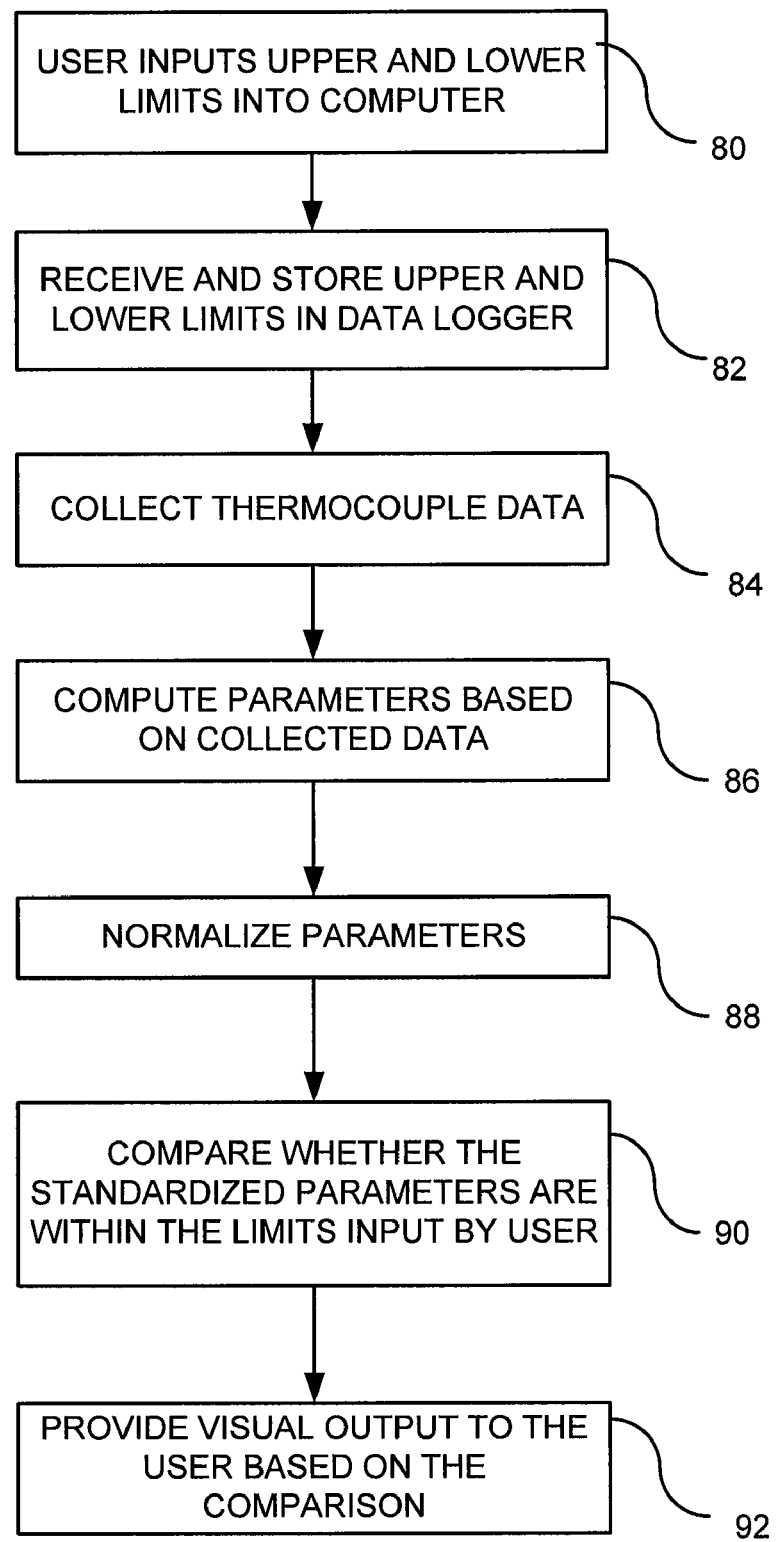
FIG. 5 is a more detailed flowchart of a method for providing a pass/fail indication using the data logger.

FIG. 5 is a more detailed flowchart of a method for testing oven settings using a data logger. In process block 80, a user inputs upper and lower limits for each parameter associated with a product profile into a computer. The upper and lower limits represent criteria needed to pass for each parameter. In process block 82, the upper and lower limits for each parameter are downloaded to the data logger and stored therein. In process block 84, the data logger collects temperature data in a well-known manner. In process block 86, the data logger computes the parameters based on actual data received from the thermocouple sensors. The computation is accomplished by reading the stored temperature data and, depending on the parameter, performing a time/temperature analysis or just a temperature analysis. For example, peak temperature is a computation that requires only temperature data. On the other hand, time above liquidous depends on time and temperature. Process block 88 is an added feature that the computed parameters are normalized to a standard scale. For example, any calculation can be converted to a 0-10 scale. In process block 90, a comparison is performed to determine whether the computed parameters that were converted to a standard scale are within the limits set by the user. A visual indication to the user is then output to indicate whether the test passed or failed (process block 92). If the data logger is equipped with a more sophisticated display element, a number indicative of the results may be displayed.

The present embodiments may also be applied to cooling machines rather than ovens.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

I claim:

1. A data logger, which is an electronic device for passing through a conveyor oven and which is independent of the conveyor oven, for determining whether a product profile is within desired limits, comprising:
   an outer housing sized to pass through the conveyor oven;
   a controller within the outer housing coupled to an input for receiving thermocouple data when the data logger is passed through the conveyor oven;
   a memory within the outer housing coupled to or within the controller for storing the thermocouple data and for storing criteria indicative of a desired product profile;
   a user interface located on the outer housing of the data logger for submitting a request to the controller for determining whether the received thermocouple data is within limits of the stored criteria; and
   a display located on the outer housing of the data logger and coupled to the controller for displaying an indication whether the received thermocouple data is within limits of the stored criteria.

2. The data logger of claim 1, wherein the display is an LED.

3. The data logger of claim 1, further including a clock coupled to the controller.

4. The data logger of claim 1, wherein the user interface further includes a push button positioned on the data logger and coupled to the controller for requesting whether the product profile is within the desired limits.

5. The data logger of claim 1, further including thermocouples coupled to the data logger.

6. The data logger of claim 1, further including an A/D converter coupled between the controller and the input.

* * * * *